United States Patent Office 3,137,756
Patented June 16, 1964

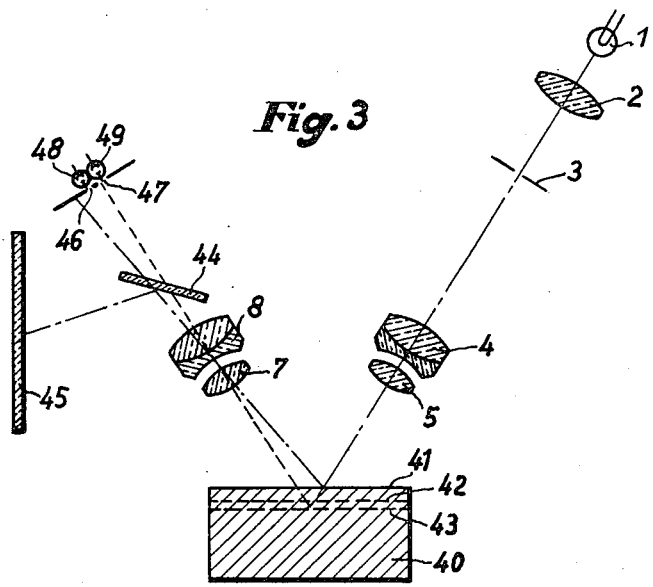
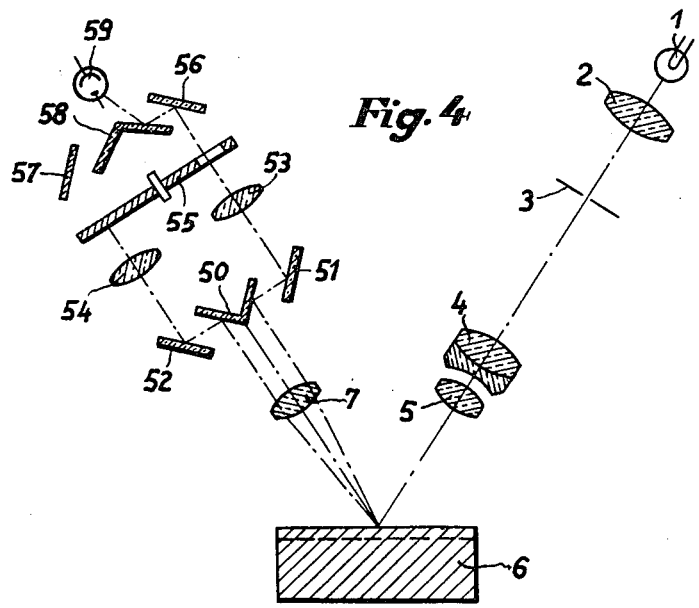

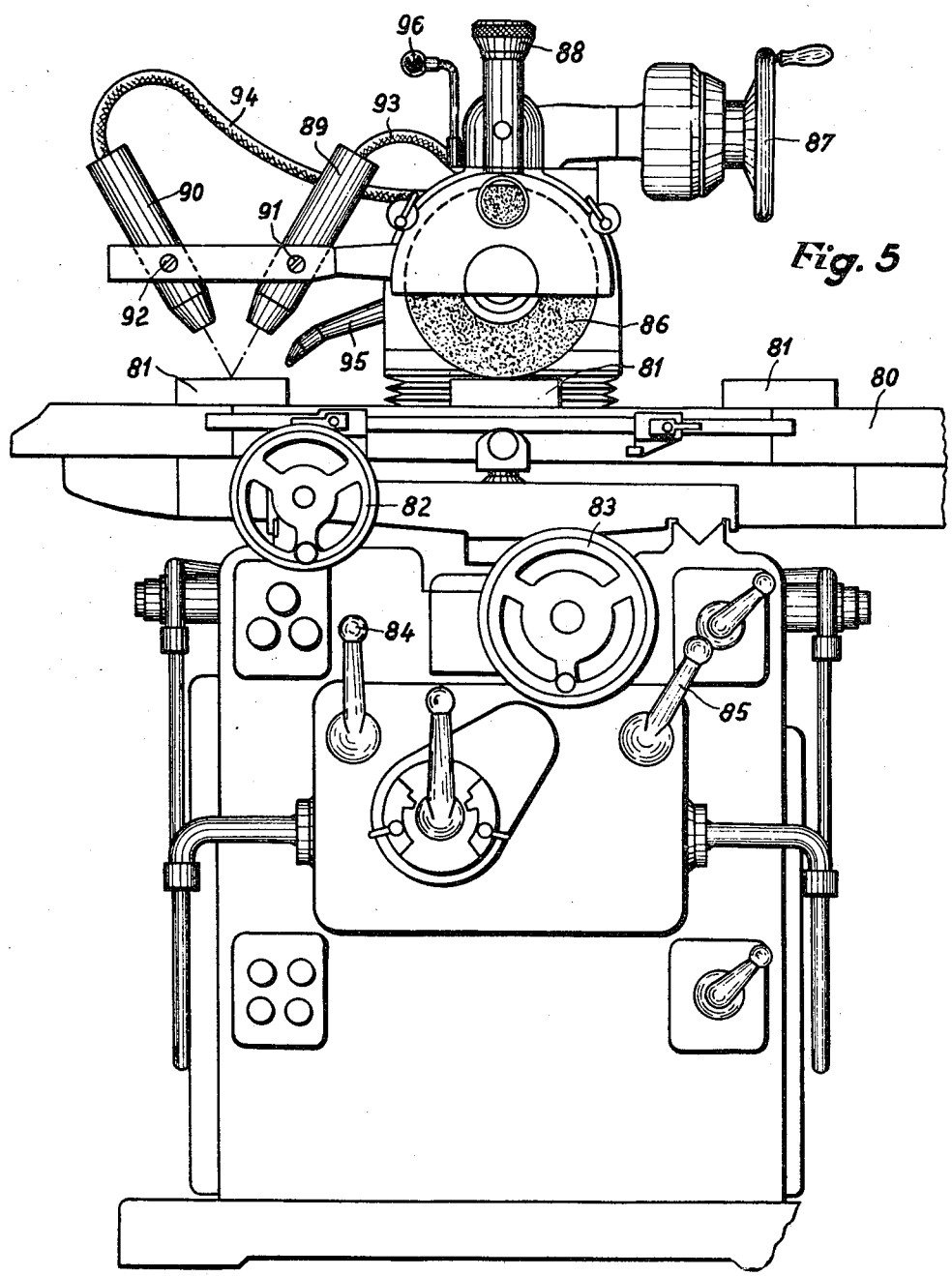

3,137,756
DEVICE FOR DETERMINING THE DIMENSIONS OF AN OBJECT
Norbert Günther, Aalen, Wurttemberg, Werner Illig, Heidenheim (Brenz), Wurttemberg, and Armin v. Hünerbein, Aalen, Wurttemberg, Germany, assignors to Carl Zeiss, Heidenheim (Brenz), Wurttemberg, Germany
Filed Oct. 29, 1958, Ser. No. 770,498
Claims priority, application Germany Oct. 31, 1957
1 Claim. (Cl. 88—14)

The invention relates to a device for determining the dimensions of an object without touching the object. The invention may be employed for all types of measurements and also for the automatic control of machines, for instance, for controlling the operation of machine tools.

In accordance with the method of the present invention, at least one mark is projected onto the surface of a standard thickness gauge and by means of an observation device which is focussed to this standard thickness gauge, the position of the observed image of this mark is fixed. Thereupon, the gauging rule is replaced by the object to be measured and the image of the mark now observed is correlated to the previously observed image of the mark. This actual measuring method may consist in a purely optical determination of the relative positions of the images of the mark. It is, however, advisable to select the more sensitive zero-adjustment method and to displace the projection device and observation device or parts of said devices until the image of the mark projected onto the surface of the object to be measured appears at the same position as the image of the mark which is projected onto the surface of the standard thickness gauge. This displacement determines the desired measurement. The displacement is preferably made automatic by means of at least one photo-electric receiver.

The new method can also be employed with advantage for determining the thickness of a layer. For this purpose is measured the mutual distance between the two images of the mark which appear simultaneously on the border surfaces of the layer. The thickness of the layer can be directly determined from the above measurement, when the refractive index of the layer is known. Conversely, it is also possible to determine with this new method the refractive index of a layer when the thickness of this layer is known.

In the last named case, the use of said standard thickness gauge can be eliminated and the fixing of the position of the gauge image can be eliminated, because the measurement is restricted to the determination of the mutual distance between two simultaneously visible images of the mark.

The distance between the two mark images can be determined by means of an ocular scale which is arranged in the observation device. For carrying out, however, continuous measurements of the thickness of layers, it is advisable to arrange for a photoelectric indication of the measuring values.

In accordance with the present invention, the measuring device consists of a mark projector, which is inclined towards the measuring surface and an observation device which is focussed onto said surface. The observation of the mark and preferably contains an element for fixing the position of this image. Such an element, for instance, in the case of purely optical observation, may consist of an ocular gauge arranged in the observation device.

It is advisable to employ photo-electric receivers in the image plane of the observation device for measuring the thickness of an object. When the light falls onto said receiver an electric current is produced which when suitably amplified can be used for the control of a resetting adjustment device, which will automatically effect the compensation. After the resetting, the image of the mark which is projected onto the surface of the object to be measured will again appear at the same position as the image of the mark which is projected onto the surface of said standard thickness gauge. The measurements of the object can thus be determined by the amount of displacement. For measuring the displacement of a continuously moving workpiece, electrical, electronic, mechanical or optical means may be used or suitable combinations of these means.

The displacement of the image of the mark observed during the measurement to the position of the image of the mark observed during gauging can be effected, for instance, by a displacement of the entire measuring device in vertical direction. It is also possible, and in some cases it is of advantage to displace the objectives or the respective parts of the objectives of the projection and the observation devices.

Furthermore, it may be of advantage to arrange in the path of the light of the projection and the observation device optical elements which when being oscillated displace the image of the mark. The measurement of an object can thus be determined by the amount of oscillation.

It is also possible to displace for the measurement the photoelectric receivers arranged in the image plane of the observation device. There is also the possibility of displacing the observation device transversely, but parallel to itself, or to displace the support of the workpiece.

The above mentioned measuring device can be advantageously employed for continuous measurement of workpieces, for instance, for a continuous measurement of the thickness of the workpieces. The inventive device can also be used for the control of machine tools, in which case the device can also be advantageously employed for the series control and classifying of workpieces.

In a device used for measuring the thickness of layers, the observation device is designed in such a manner that the light beam originating from the upper border-surface of the layer, and also from the lower border-surface of the layer, each are provided with a photo-electric receiver. The receiver provided in the path of the light beam originating from the bottom surface of the layer is connected with a resetting adjustment device which upon a change in the thickness of the layer will adjust the receiver or an optical element disposed in front of the receiver until compensation has been obtained. Said resetting adjustment device is connected with a device for indicating the above mentioned displacement. This displacement produced by the resetting adjustment device is a measurement of the thickness of the layer.

In order to make an accurate measurement of the layer independently of any irregularities in the same, the photoelectric receiver which is disposed in the path of the light beam originating from the upper border surface of the layer is preferably also connected with a resetting device. This last named device will displace the receiver or an optical element disposed in front of said receiver when irregularities on the layer surface are present, until compensation has been obtained.

In order to provide an arrangement which will continuously control and supervise the thickness of a layer or of a foil which is arranged on a carrier, the receiver which is arranged in the path of the light beam originating from the bottom surface of the layer is preferably connected with a signal device. This signal device will be operated when the thickness of the layer changes so that transverse deflection of the light beam occurs which reaches the receiver. In this case the receiver is adjusted from the beginning in such a manner that the signal device will not be operated when the layer has the predetermined thickness. In case the thickness of the layer deviates from the predetermined value the light beam reaching the receiver will be deflected transversely and will actuate said signal device. This signal device can be used, for instance, for advising the operating personnel of a fault, or may also be used for the direct control of the machine which applies the layer.

The drawings illustrate various embodiments of the device of the present invention. Referring to the drawing:

FIGURE 3 illustrates another modified embodiment for determining limiting sizes and which operates without a resetting control.

FIGURE 4 illustrates still another modified embodiment of the device of the invention.

FIGURE 5 illustrates a surface grinder which is equipped with a measuring device according to the invention, the operation of this surface grinder being controlled by this device.

Figure 1:
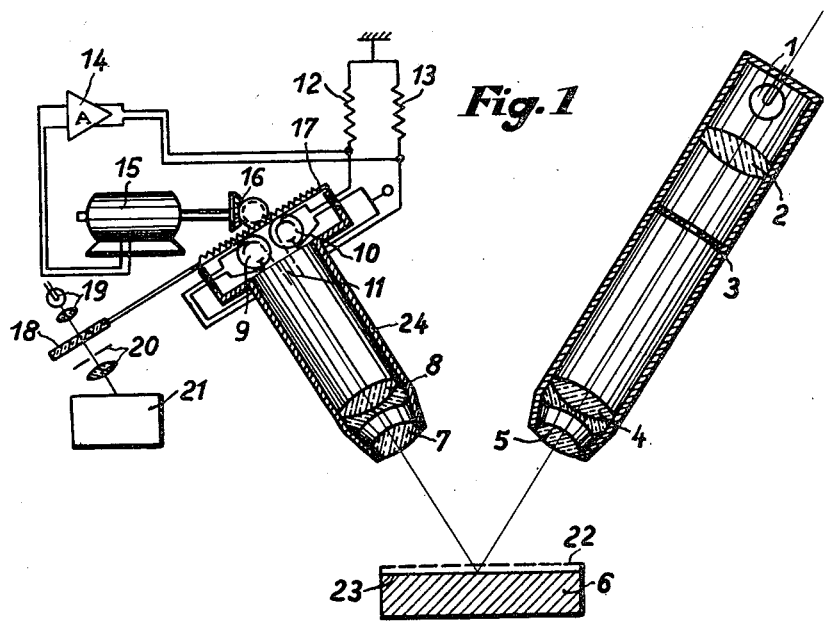
FIGURE 1 illustrates a device for determining the thickness of an object by automatically displacing photocells arranged in the observation device.

In the device illustrated in FIGURE 1, an alternating current light source is used for illuminating a slit 3 by means of a lens 2. This slit 3 is projected by an objectives 4, 5 onto the surface of a workpiece 6 and forms there a mark. An observation device 24 is focused onto said surface. The observation device 24 is provided with an objective consisting of the lenses 7 and 8 and is used for observing said mark. The photo-electric cells 9 and 10 are arranged adjacent each other in the image plane of the observation device 24 in such a manner that a slit 11 is formed between them. The photo-electric cells are coupled to resistances which are designated with numerals 12 and 13. The voltages produced by resistance drop along the resistances 12 and 13 are arranged in opposition to each other and are fed to an alternating current amplifier 14. The voltage furnished by the amplifier is supplied to a motor 15, which by means of a gearing 16 operates a rack plate 17 on which the photo-electric cells 9 and 10 are mounted. A glass scale 18 is connected with said rack plate 17. The scale 18 is illuminated by an illuminating system 19. A projection system 20 is provided for projecting the illuminated portion of the scale 18 upon a frosted glass plate 21.

When a measurement is to be made with a device according to FIG. 1, the workpiece 6 is replaced by a standard thickness gauge. The surface of the standard thickness gauge is designated with 22. The entire device is subsequently displaced in vertical direction until the image of the mark observed by the observation device 24 coincides with the slit 11. The starting value, which is used for the measurement will then appear on the frosted glass plate 21. When the standard thickness gauge is replaced by the workpiece 6, the surface of which is designated 23, an image of the slit 3 will be projected on the surface 23 there forming the mark. Since said last named surface 23 lies lower than the surface 22 of the standard thickness gauge, the image of the mark will appear to the observer to have been displaced to the left. The photo-electric cell 10 will therefore receive a current, the voltage drop on the resistance 13 will exceed the voltage drop on the resistance 12, and the difference between these voltages will be amplified by the amplifier 14. The motor 15 will be energized and will drive the gearing so that the plate 17 will be displaced until the image of the mark will coincide with the slit 11. The size of this displacement will be indicated on the frosted glass plate 21, so that when the scale is suitably calibrated thes cale divisions on the glass plate 18 will permit a direct reading of the measurement of the workpiece 6.

In case of a relatively large aperture of the projecting and observation device, it is possible, during the displacement of the surface of the workpiece relative to the surface of the gauging scale, that in addition to the transverse displacement of the image of the mark there will occur a widening and a certain lack of sharpness in the image of the mark. This, however, has no significance, because the above described arrangement will always adjust the device to the main point of the image of the mark. Due to the fact that the photo-electric cells 9 and 10 are connected in opposition, light currents of the same strenght, when energizing the photo-electric cells will not effect a displacement of the plate 17.

The arrangement shown in FIG. 1 can be employed to advantage in a method for continuously measuring the thickness of an object. It is also possible to mount this arrangement onto a machine tool so as to adjust the machine tool in accordance with the different positions of the plate 17. For this purpose the plate 17 will have to be provided with a contactor. It is also possible to use this arrangement for series-control and for the classifying of workpieces. If, for instance, the plate 17 is connected with a contactor, when workpieces are to be classified, then a contact corresponding to the respective thickness of the workpiece will be closed, and it will thus be possible, for instance, to drop the workpieces in different containers, which containers correspond to the different measurements of the workpieces.

Instead of a continuous adjustment of the device by means of the amplifier 14 and the motor 15, as shown in FIG. 1, it is also possible to provide an arrangement in which the motor is energized by a constant voltage, in which case the amplifier 14 is replaced by a relay for connecting and disconnecting the voltage supply.

In the arrangement shown in FIG. 1, the angles between the vertical axis of the workpiece and the optical axes of the projection and observation devices are equal to each other. In principle it is also possible to make these angles different from each other. It is also possible to select an angle which is different from the angle shown in the drawing, since the sensitivity of the device increases, the more the angle between the projection and observation devices approaches 180°. In some cases it may also be of advantage to combine the objectives of the projection and observation devices, i.e., to provide a single objective.

Figure 2:
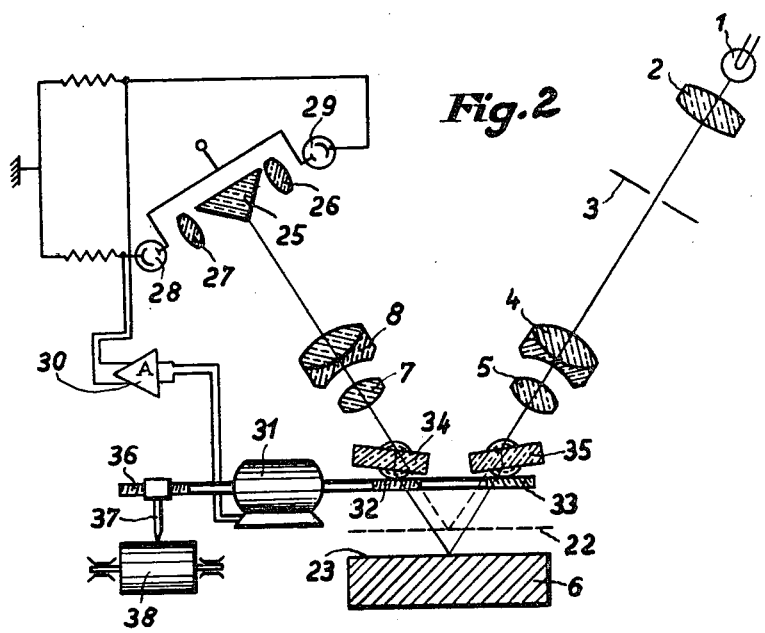
FIGURE 2 illustrates a modified embodiment of the device, in which the measurement is made by oscillating plane-parallel plates arranged in the path of the light beams.

In the device according to FIG. 2, oscillatable plane-parallel plates 34 and 35 are arranged in the path of the light beam of the observation device and projector, respectively. When in this particular case the standard thickness gauge surface 22 is replaced by the surface 23 of the workpiece 6, the photo-electric cell 29 will receive light over the prism 25 and a lens 26. This will then produce a voltage at the input of the amplifier 30 and the motor 31 will be actuated. The gearings 32 and 33 driven by the motor 31 will rotate the plane-parallel plates 34 and 35 in such a manner that the image of the mark will appear exactly at the same lateral position as the image of the mark projected onto the standard thickness gauge. The mark will, however, be displaced in the downward direction. When the above mentioned condition is obtained, the same amount of light will energize both photo-electric cells 28 and 29 over the prism 25 and the lenses 26 and 27, respectively, and as a result the motor 31 will stop.

The plane-parallel plates 34 and 35 can be replaced by other equivalent optical elements.

A threaded spindle 36 is connected with the motor 31 in such a manner that when the motor rotates it will displace a stylus 37 along the spindle 36. This stylus 37 draws on a rotating drum a curved line or a graph corresponding to the rotative adjustment of the plane-parallel plates 34 and 35. When the drum 38 is provided with an appropriate calibration the position of the stylus 37 will indicate the size or other measurement of the workpiece 6.

positely moved, when the device is displaced, or when an adjustment of the compensating elements, for instance, plane-parallel plates, is employed. At the start of the measurement, the device is adjusted in such a manner that only a single image can be observed in the eyepiece. When the standard thickness gauge is replaced by the workpiece, two images will be formed in the eyepiece provided that the measurement of the workpiece is not in conformity with the standard thickness gauge. The compensating elements are now adjusted until the two part images are brought again to coincidence. The last mentioned adjustment can be effected manually or can be carried out automatically by a photo-electric receiver and serves for determining the dimensions of the workpiece.

We claim:

A device for determining the thickness of an object, including a standard thickness gauge, means for projecting a mark upon the surface of said standard thickness gauge, an optical measuring device focused upon the surface of said standard thickness gauge and producing an image of said mark in its own image plane, means for displacing said mark image after an object to be measured has been substituted for said standard thickness gauge until it appears in the same position as the image of the mark projected upon said standard thickness gauge, said means for displacing said mark image including two simultaneously adjustable optical elements arranged in the path of said projecting means and in the path of said optical measuring device respectively, said two simultaneously adjustable optical elements comprising two plane parallel plates, means for rotatably disposing one of said plates in the path of light of the projecting device and the other plate in the path of the measuring device, gear means operatively connected with both said plane parallel plates, and an electric motor connected with said gear means to operate the same and cause a simultaneous rotatable adjustment of said plane parallel plates in opposite direction, said measuring device including an optical element for splitting the beam of light emerging from said mark into two beams, a photo-electric receiver disposed in the path of each one of said two beams of light, said receivers being connected in opposition to each other, said electric motor being energized by the photo-electric current produced by said two receivers, said motor when operated displacing said two optical elements employed for the displacement of the image of the mark, and means for registering said displacement.

References Cited in the file of this patent

UNITED STATES PATENTS

| | | |
|---|---|---|
| 1,854,760 | Paulson | Apr. 19, 1932 |
| 2,429,066 | Kuehni | Oct. 14, 1947 |
| 2,441,107 | Turner | May 4, 1948 |
| 2,446,628 | Brown | Aug. 10, 1948 |
| 2,483,102 | Pierson | Sept. 27, 1949 |
| 2,703,505 | Senn | Mar. 8, 1955 |
| 2,709,944 | Marx | June 7, 1955 |
| 2,771,149 | Miller et al. | Nov. 20, 1956 |
| 2,791,310 | Jones | May 7, 1957 |
| 2,837,960 | Miller | June 10, 1958 |

FOREIGN PATENTS

| | | |
|---|---|---|
| 672,892 | Great Britain | May 28, 1952 |
| 926,092 | Germany | Apr. 7, 1955 |